United States Patent
Nemeth (10) Patent No.: US 11,630,906 B2
(45) Date of Patent: Apr. 18, 2023

(54) PRINT JOB SECURITY FOR ERROR ANALYSIS

(71) Applicant: Rose Nemeth, Boulder, CO (US)

(72) Inventor: Rose Nemeth, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 17/219,959

(22) Filed: Apr. 1, 2021

(65) Prior Publication Data

US 2022/0318410 A1    Oct. 6, 2022

(51) Int. Cl.
| | |
|---|---|
| G06F 21/60 | (2013.01) |
| G06F 3/12 | (2006.01) |
| H04L 9/32 | (2006.01) |
| H04L 9/08 | (2006.01) |
| G06K 15/02 | (2006.01) |

(52) U.S. Cl.
CPC .......... G06F 21/608 (2013.01); G06F 3/1222 (2013.01); G06F 3/1238 (2013.01); G06K 15/1805 (2013.01); G06K 15/1836 (2013.01); H04L 9/0825 (2013.01); H04L 9/3213 (2013.01)

(58) Field of Classification Search
None
See application file for complete search history.

(56) References Cited

U.S. PATENT DOCUMENTS

| | | |
|---|---|---|
| 7,475,251 B2 | 1/2009 | Hull et al. |
| 8,442,222 B2 | 5/2013 | Yoshimura et al. |
| 8,564,804 B2 | 10/2013 | Sakurai et al. |
| 10,331,861 B2 | 6/2019 | Condon et al. |
| 10,445,031 B2 | 10/2019 | Ikari |

(Continued)

FOREIGN PATENT DOCUMENTS

| | | |
|---|---|---|
| CN | 109547656 A | 3/2019 |
| EP | 3159824 B1 | 8/2020 |

(Continued)

OTHER PUBLICATIONS

English translation of Japanese Patent Application 2003-390379, corresponding to Japanese Patent Application Publication 2005-157414. (Year: 2003).*

(Continued)

*Primary Examiner* — Thomas D Lee
(74) *Attorney, Agent, or Firm* — Duft & Bornsen, PC (57) ABSTRACT

In the embodiments described herein, partially encrypted print jobs are described which include unencrypted print job commands and encrypted print data objects. One embodiment comprises a print controller that includes a memory and at least one processor. The memory stores a print job comprising one or more print data objects, and print job commands that define data boundaries in the print job for the print data objects. The at least one processor processes the print job commands to identify the print data objects for the print job based on the data boundaries, encrypts the print data objects using a key while the print job commands remain unencrypted, generates a partially encrypted print job comprising the encrypted print data objects and the unencrypted print job commands, and provides the partially encrypted print job.

20 Claims, 8 Drawing Sheets

(56) References Cited

U.S. PATENT DOCUMENTS

2006/0050879 A1* 3/2006 Iizuka .................. G06F 21/608
                                                          380/51
2007/0076874 A1   4/2007 Suleiman et al.
2018/0150619 A1   5/2018 Condon et al.

FOREIGN PATENT DOCUMENTS

JP    2005157414 A  *  6/2005
JP    2014065146 A  *  4/2014  ........... G06F 21/608

OTHER PUBLICATIONS

English translation of Japanese Patent Application 2012-209745, corresponding to to Japanese Patent Application Publication 2014-065146. (Year: 2012).*

Jong-Youel Park; a study on the Automated design of Business Card for Personal Information leakage prevention Using IT-based Convergent Service; International Journal of Internet, Broadcasting and Communication vol. 10 No. 4 25-30 (2018).

International Search Report; Application PCT/JP2022/016799; dated Jul. 12, 2022.

* cited by examiner

PRINT JOB SECURITY FOR ERROR ANALYSIS

FIELD

This disclosure relates to the field of printing systems, and in particular, to print job security.

BACKGROUND

Print shop operators may encounter problems when printing a print job for a customer. For example, the printed output of the print job may not match the expected output of the customer and/or the print shop operator. During such events, the print shop operator may utilize a support agent that reviews a trace capture file of the print job in order to determine what may be causing problems with the print job. When the print job includes sensitive information, this sensitive information may be available to the support agent during the support process, which is undesirable. Thus, it is apparent that improvements may be made that secure the sensitive information in a print job, while still allowing the support agent to analyze the print job to mitigate the printing errors that may arise.

SUMMARY

In a print shop, print jobs may be received that include errors, which may be difficult to solve without additional support. Because some print jobs include sensitive information, such as personal information, bank account numbers, etc., there is reluctance in the industry to forward print job data to support staff for analysis, as this may result in the intentional or inadvertent disclosure of the sensitive information. Typically print jobs include print data objects and print job commands, with the print data objects representing the actual print data that is visibly represented on a print medium or a display device, and the print job commands defining or identifying the print data objects for the print jobs in addition to specifying the formatting, rotation, size, fonts, and other control activities that are used to visually display the print data objects. In the embodiments described herein, partially encrypted print jobs are generated, which include unencrypted print job commands and encrypted print data objects. Because the print data objects are encrypted in the partially encrypted print job, access to the print data objects may be prevented unless a decryption key is available. Because the print job commands remain unencrypted in the partially encrypted print job, the command structure and other functional features of the partially encrypted print job are reviewable, which may allow errors in the print job to be corrected without decrypting the encrypted print data objects. The use of partially encrypted print jobs provides the technical benefit of ensuring sensitive information in the partially encrypted print job is protected, while allowing the format, structure, and commands in the partially encrypted print job to be analyzed independently of whatever sensitive information may be present.

One embodiment comprises a print controller that includes a memory and at least one processor. The memory stores a print job comprising one or more print data objects, and print job commands that define data boundaries in the print job for the print data objects. The at least one processor processes the print job commands to identify the print data objects for the print job based on the data boundaries, encrypts the print data objects using a key while the print job commands remain unencrypted, generates a partially encrypted print job comprising the encrypted print data objects and the unencrypted print job commands, and provides the partially encrypted print job.

Another embodiment comprises a method of securing print jobs. The method comprises storing a print job comprising one or more print data objects, and print job commands that define data boundaries in the print job for the print data objects, and processing the print job commands to identify the print data objects for the print job based on the data boundaries. The method further comprises encrypting the print data objects using a key while the print job commands remain unencrypted, generating a partially encrypted print job comprising the encrypted print data objects and the unencrypted print job commands, and providing the partially encrypted print job.

Another embodiment comprises a non-transitory computer readable medium comprising programmed instructions which, when executed by one or more processors of a print controller, directs the one or more processors to store a print job comprising one or more print data objects, and print job commands that define data boundaries in the print job for the print data objects, process the print job commands to identify the print data objects for the print job based on the data boundaries, encrypt the print data objects using a key while the print job commands remain unencrypted, generate a partially encrypted print job comprising the encrypted print data objects and the unencrypted print job commands, and provide the partially encrypted print job.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
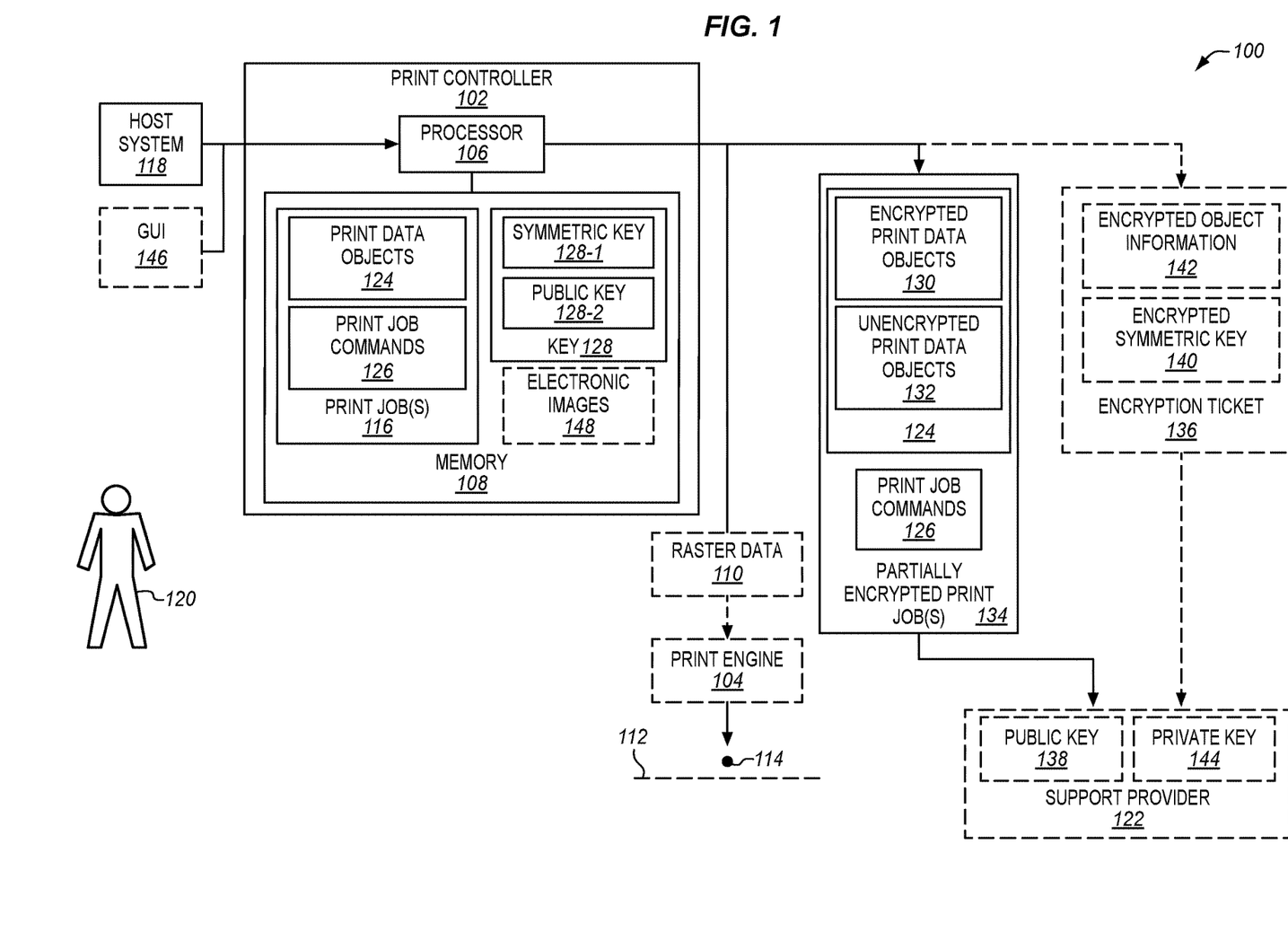
FIG. 1 is a block diagram of an apparatus in an illustrative embodiment.

FIG. 1 is a block diagram of an apparatus 100 in an illustrative embodiment. Apparatus 100 is used in a printing environment, and includes a print controller 102 that controls functions or operations performed in a printing process. Print controller may be included within a printing system, or may operate outside of a printing system as a separate element. Apparatus 100 may further include one or more print engine(s) 104 of a printing system. Print controller 102 may be implemented within print engine 104 in some embodiments.

While the specific hardware implementation of print controller 102 is subject to design choices, print controller 102 may comprise any electronic circuits and/or optical circuits that are able to perform the functions described herein for print controller 102. Print controller 102 may include one or more processors (e.g., a processor 106), Central Processing Units (CPU), Graphics Processing Units (GPU), microprocessors, Digital Signal Processors (DSPs), Application-specific Integrated Circuits (ASICs), Programmable Logic Devices, control circuitry, etc. Some examples of processors include INTEL® CORE™ processors, Advanced Reduced Instruction Set Computing (RISC) Machines (ARM®) processors, etc.

Print controller 102 may further comprise any electronic circuits, and/or optical circuits, and/or magnetic circuits that are able to store data. For instance, print controller 102 may include one or more memories (e.g., a memory 108), volatile or non-volatile Dynamic Random-Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM.

In one embodiment, print engine 104 comprises any system, component, or device that marks a medium 112 with one or more colorant(s) 114. In another embodiment, print engine 104 comprises any system, component, or device that performs a 3-Dimensional printing process, using any suitable material as desired.

Colorant 114 may comprise toner, liquid inks, wax, or any material suitable to mark medium 112. Medium 112 may be continuous form or cut sheet, as desired. Medium 112 may comprise paper, textile, plastic, or any tangible substrate suitable for marking with colorant 114. Print engine 104 may comprise one or more marking engines as a matter of design. For example, print engine 104 may comprise at least one marking engine disposed on each side of medium 112. During the printing process, print controller 102 may transmit or provide raster data 110. Print engine 104 may receive raster data 110, and generate a printed output based on raster data 110.

In a print shop environment, print controller 102 may receive print job(s) 116 (e.g., from a host system 118) for processing by apparatus 100. In some cases, print jobs 116 may include errors which, when rasterized by processor 106 and printed by print engine 104, results in a printed output that is incorrect. If a print operator 120 is unable to determine the cause of the errors in print jobs 116, print operator 120 may utilize a support provider 122 to analyze information about print jobs 116 and provide recommendations as to how to resolve the errors in print jobs 116. In some embodiments, support provider 122 comprises a remote entity with respect to apparatus 100, with expertise in analyzing and resolving errors in the commands, formatting, structure, and/or assembly of print jobs 116. In other embodiments, support provider 122 comprises a local entity with respect to apparatus 100, who also may have expertise in analyzing and resolving errors in the commands, formatting, structure, and/or assembly of print jobs 116.

Although errors in print jobs 116 may be an uncommon occurrence, errors in print jobs 116 may arise for a number of reasons. For instance, a customer may generate print job 116 at host system 118 having images in a first data format, and accidentally specify in print job 116 that the images are in a second data format. In this example, when processor 106 generates raster data 110 with the image format error in print job 116, the image data may be interpreted incorrectly by processor 106 due to the error in print job 116, resulting in a printed output that is incorrect. In some cases, errors in print job 116 may be difficult to diagnose. For instance, print jobs 116 may include thousands of printable features that are spatially related to each other, partially overlay each other, have transparency aspects with respect to each other, etc.

In prior systems, a print shop employee may generate a trace file during a debug process, which captures and forwards data from jobs to a support specialist. However, because the jobs may include sensitive information, such as bank account numbers, patient information, address information, or other types of personally-identifiable and/or sensitive information, providing the trace file to the support specialist potentially exposes sensitive information to another party, which is undesirable. While one solution may be to encrypt the jobs in their entirety prior to submitting the trace file to the support specialist, this approach prevents the support specialist from analyzing the information in the trace file without first decrypting the job, which defeats the purpose of securing the sensitive information which may be present in jobs.

In the embodiments described herein, printable information for print jobs 116 is encrypted, while some or all of the commands and data structures in print jobs 116 representing non-printable information remains unencrypted. The result is a partially encrypted job that allows for the analysis the structure and function of the partially encrypted job while the printable information remains secure unless decrypted. If decrypting the printable information is warranted during an enhanced analysis phase, some or all of the printable information in the partially encrypted job may be decrypted to support an enhanced analysis phase of the debug process. Various means may be used during this enhanced analysis phase to ensure that the sensitive information in the partially encrypted job remains secure from inadvertent or intentional disclosure, such as the use of employee monitoring, air-gapped computers, etc.

Referring again to FIG. 1, print jobs 116 include print data objects 124, which comprise any type of data structure that represents printable information. Print data objects 124 may comprise data objects that are included within print job 116 itself, and/or data objects that are external to print job 116 and referenced within print job 116. Some examples of print data objects 124 include text, images, graphics, bar codes, etc. Print jobs 116 further include print job commands 126, which comprise any type of data structure that identifies print data objects 124 for print jobs 116. In some embodiments, print data objects 124 comprise inline data within print jobs 116, and print job commands 126 define the data boundaries within print jobs 116 for print data objects 124. In other embodiments, print data objects 124 are external data objects, and print job commands 126 define the data boundaries within print jobs 116 for references to print data objects 124.

Print job commands 126 may further define how print data objects 124 are represented as a printed output, including formatting information, rotation information, font sizes, page layout information, background colors, etc. More broadly speaking, print job commands 126 include any type of command which instructs processor 106 as to how to represent a printed output of print job 116.

Figure 2:
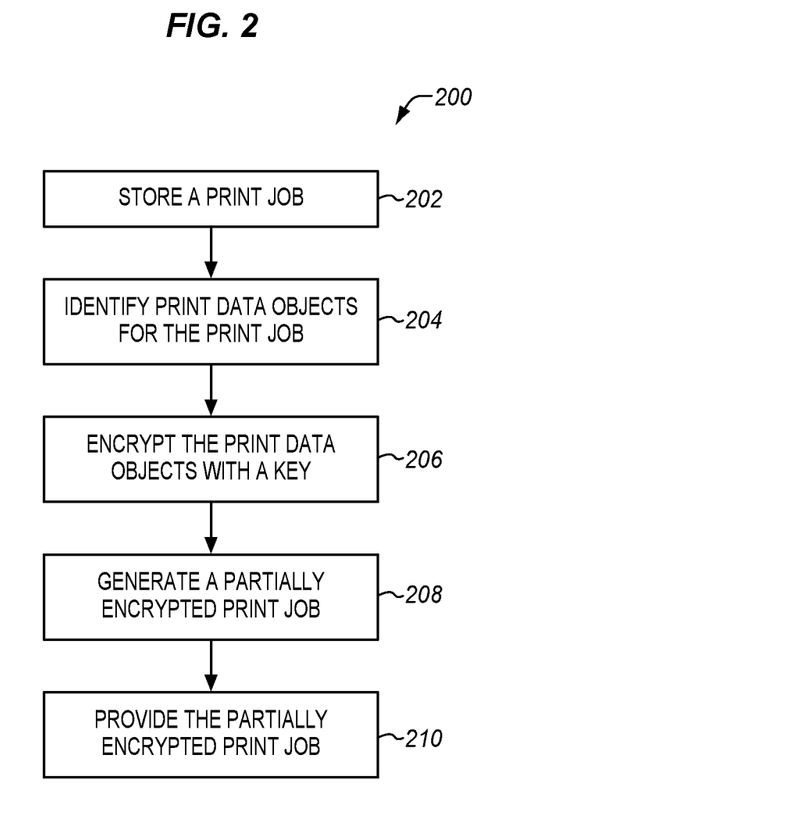
FIG. 2 is flow chart of a method of securing print jobs in an illustrative embodiment.
Figure 6:
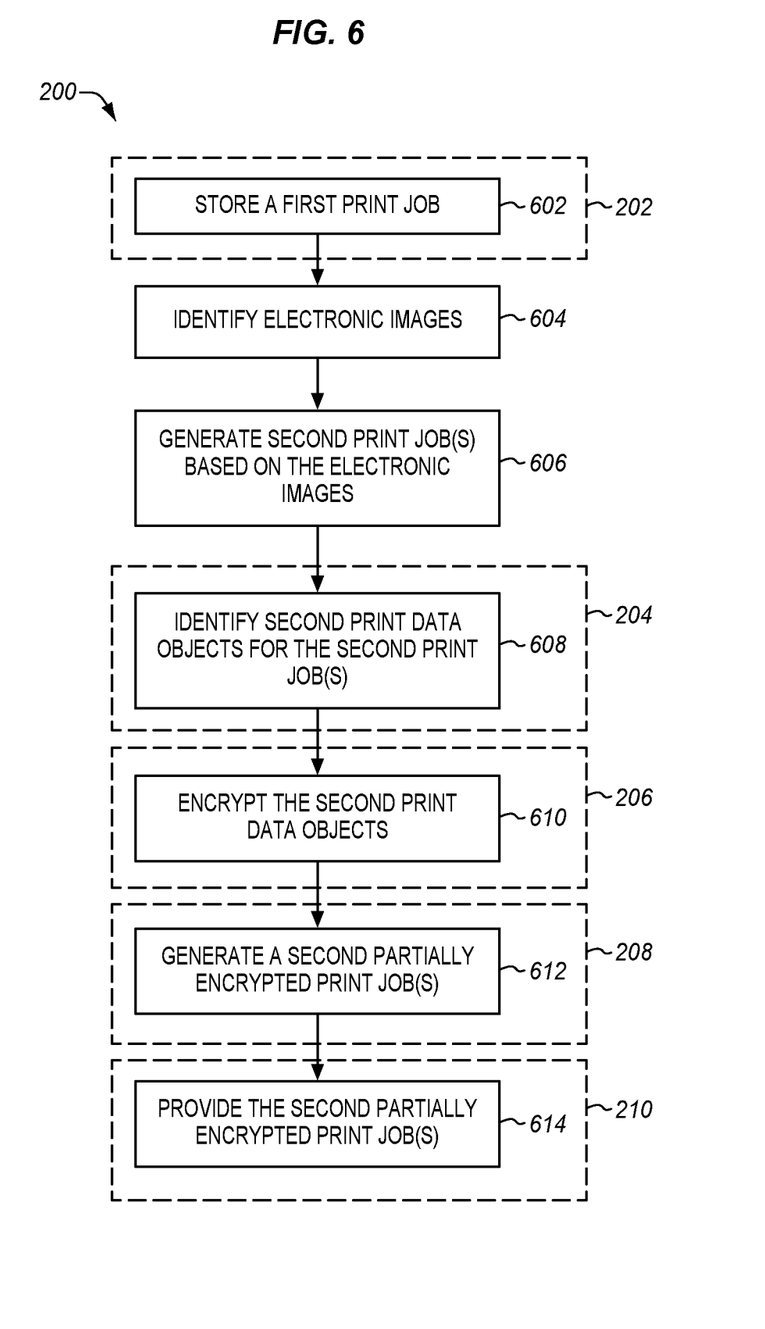
Figure 7:
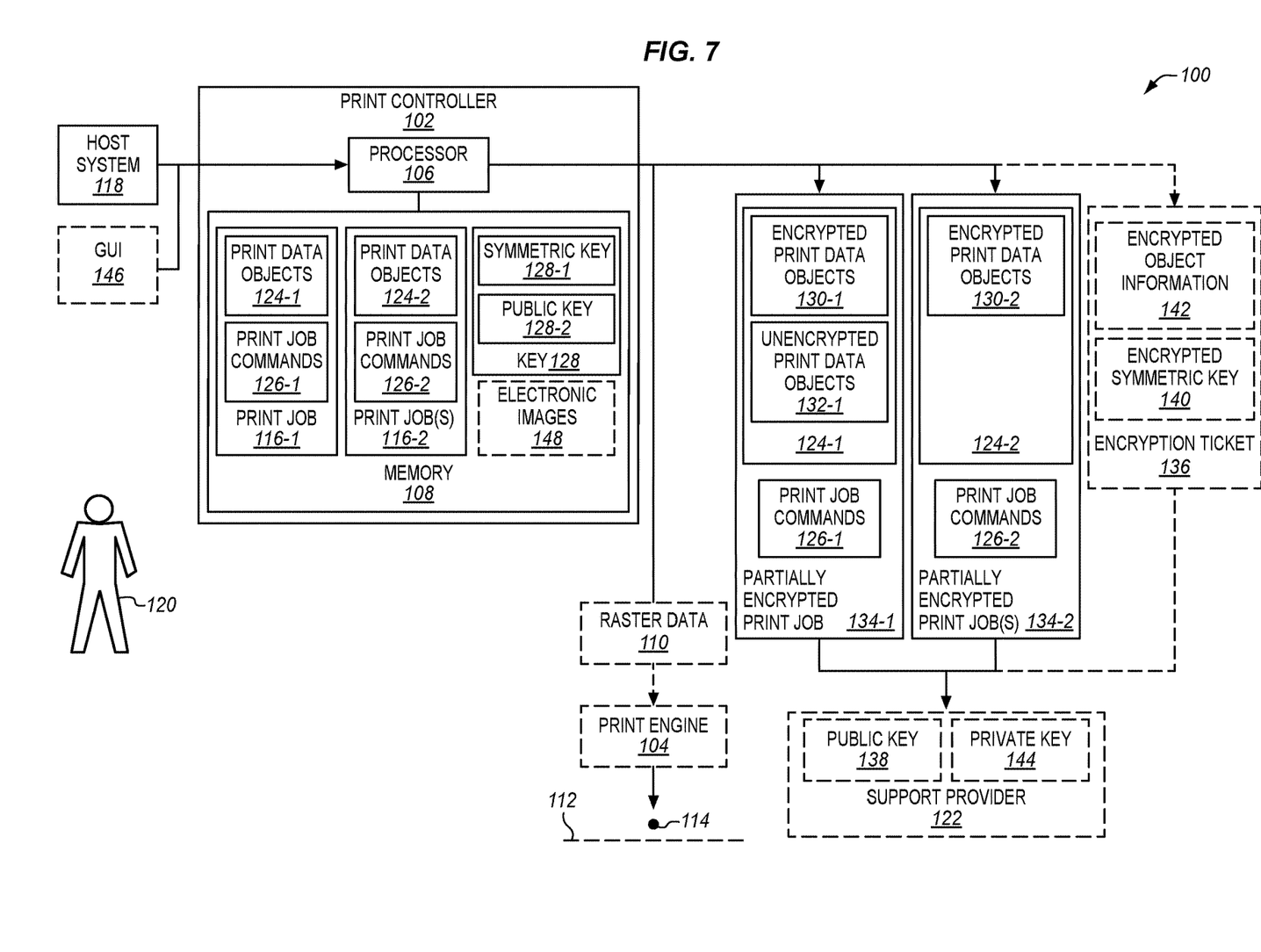
FIG. 7 is a block diagram of the apparatus of FIG. 1 in another illustrative embodiment.

Consider that print controller 102 is operational and ready to begin processing print jobs 116. FIG. 2 is a flow chart of a method 200 of securing print jobs in an illustrative embodiment. FIGS. 3-6 illustrates additional details of method 200 in illustrative embodiments, and FIG. 7 is a block diagram of apparatus 100 in another illustrative embodiment.

Method 200 will be discussed with respect to apparatus 100 FIG. 1, although method 200 may be performed by other systems, not shown. The steps of the flow charts described herein may include other steps that are not shown. Also, the steps of the flow charts described herein may be performed in an alternate order.

Referring to FIG. 2, processor 106 receives print job 116 (e.g., from host system 118), and stores print job 116 in memory 108 (see step 202). Print job 116 may represent a job submitted by a customer for production printing. Print job 116 may utilize a Page Description Language (PDL) to describe print data objects 124 in print job 116. Some examples of a PDL include the Portable Document Format (PDF), an Intelligent Printer Data Stream (IPDS), POST-SCRIPT®, etc.

Returning again to FIG. 2, processor 106 analyzes print job commands 126 to identify print data objects 124 for print job 116 (see step 204). For example, IPDS is a host-to-printer data stream for Advanced Function Presentation (AFP) architectures. IPDS provides an attachment-independent interface for controlling and managing AFP printers, allowing the presentation of pages containing an unlimited mixture of different data types, including text, images, graphics, bar codes, and object containers. IPDS allows different applications, which can be independent of each other, to create source data (e.g., graphics, images, bar codes, text). The IPDS architecture allows the output of these independent applications to be merged at print time, so that an integrated mixed-data page is the result.

An IPDS data stream includes data and controls defined through self-identifying structured fields, called IPDS commands, which describe the presentation of print data. Thus, in embodiments that utilize print jobs 116 formatted in IPDS, processor 106, when identifying print data objects 124 for print job 116, may parse print job 116 to identify the IPDS structured fields in print job 116 that define the data boundaries of different types of printable data and/or references to container objects which store the printable data.

Some examples of print job commands 126 in the IPDS format are described below.

One example of print job commands 126 that may be found within print jobs 116 are Write Text (WT) commands. WT commands are used to identify text for print jobs 116. WT commands are used to transmit up to 32K bytes of character data and controls to a printer. This data is part of a text object, page segment, or overlay, depending on the state of the printer. The WT commands carry Presentation Text Object Content Architecture (PTOCA) data and PTOCA control sequences.

Another example of print job commands 126 that may be found within print jobs 116 are Write Image (WI) commands. WI commands are used to identify images for print jobs 116. WI commands transmit IM-Image data to a printer as a sequence of scan lines.

Another example of print job commands 126 that may be found within print jobs 116 are Write Image 2 (WI2) commands. WI2 commands transmit Image Object Content Architecture (IOCA) image data and the parameters that define the image data to a printer.

Another example of print job commands 126 that may be found within print jobs 116 are Write Graphics (WG) commands. WG commands transmit graphics data to a printer. The data consists of graphics segments that contain the drawing orders that define the picture in a graphics presentation space.

Another example of print job commands 126 that may be found within print jobs 116 are Write Bar Code (WBC) commands. A WBC command transmits Bar Code Object Content Architecture (BCOCA) bar code symbol data for a bar code symbol including the parameters that locate the bar code symbol origin within a bar code object area.

Another example of print job commands 126 that may be found within print jobs 116 are Write Object Container (WOC) commands. The WOC command transmits object container data to a printer. The type of data in the WOC command is specified in a Write Object Container Control (WOCC) command.

Referring again to FIG. 2, processor 106 encrypts one or more print data objects 124 using a key 128 in order to generate encrypted print data objects 130 (see FIG. 1), while not encrypting print job commands 126 (see step 206). In some embodiments, key 128 comprises a symmetric key 128-1, while in other embodiments, key 128 comprises a public key 128-2. In one embodiment, public key 128-2 comprises a public key 138 of support provider 122.

Symmetric key algorithms in cryptography use the same key for both encrypting plain text data and decrypting cypher text data. Symmetric key algorithms may comprise either stream ciphers or block ciphers. For example, print controller 102 may use a block cipher to encrypt print data objects 124 for print job 116 using symmetric key 128-1 during a job trace operation (e.g., when generating partially encrypted trace file for analysis). One example of a block symmetric encryption algorithm is the Advanced Encryption Standard (AES), which uses a block length of 128 bits and three different encryption key lengths of 128, 192, or 256 bits.

Asymmetric cryptography is a cryptographic system which uses pairs of keys. Public keys, which are known by others, and private keys, which are secret and known to the key-pair owner. Key pairs in this type of system allow the owner to publish the public key, which is used by others to encrypt plain text to generate cypher text. The private key is then used by the key-pair owner to decrypt the cypher text to recover the plain text. Asymmetric cryptography relies on a one-way functional nature of a two-key asymmetric cryptography system, which constrains the public key to the singular option of encrypting data. The public key cannot be used to decrypt the cypher text in this type of encryption system. This ensures that if processor 106 uses public key 138 of support provider 122 to encrypt print data objects 124, then support provider 122, who retains a private key 144 that is secret, has the exclusive ability to decrypt the encrypted versions of print data objects 124.

Referring again to FIG. 2, processor 106 generates a partially encrypted print job 134 that includes encrypted print data objects 130 and print job commands 126 that are unencrypted (see step 208), and provides partially encrypted print job 134 (see step 210). For example, partially encrypted print job 134 may be provided to support provider 122.

Partially encrypted print job 134 may include both encrypted print data objects 130 and unencrypted print data objects 132 in some embodiments. For instance, print operator 120 may elect to encrypt printable text in print job 116 that includes sensitive information, while allowing publicly available images that do not include sensitive information to remain unencrypted. When partially encrypted print job 134 includes both encrypted print data objects 130 that have been encrypted using symmetric key 128-1 not known to support provider 122 and print job commands 126 from print job 116 that remain unencrypted, support provider 122 is able to analyze the command structure of print job 116 using print job commands 126, while support provider 122 is prevented from accessing encrypted print data objects 130 in partially encrypted print job 134 unless support provider 122 is provided access to symmetric key 128-1.

Figure 3:
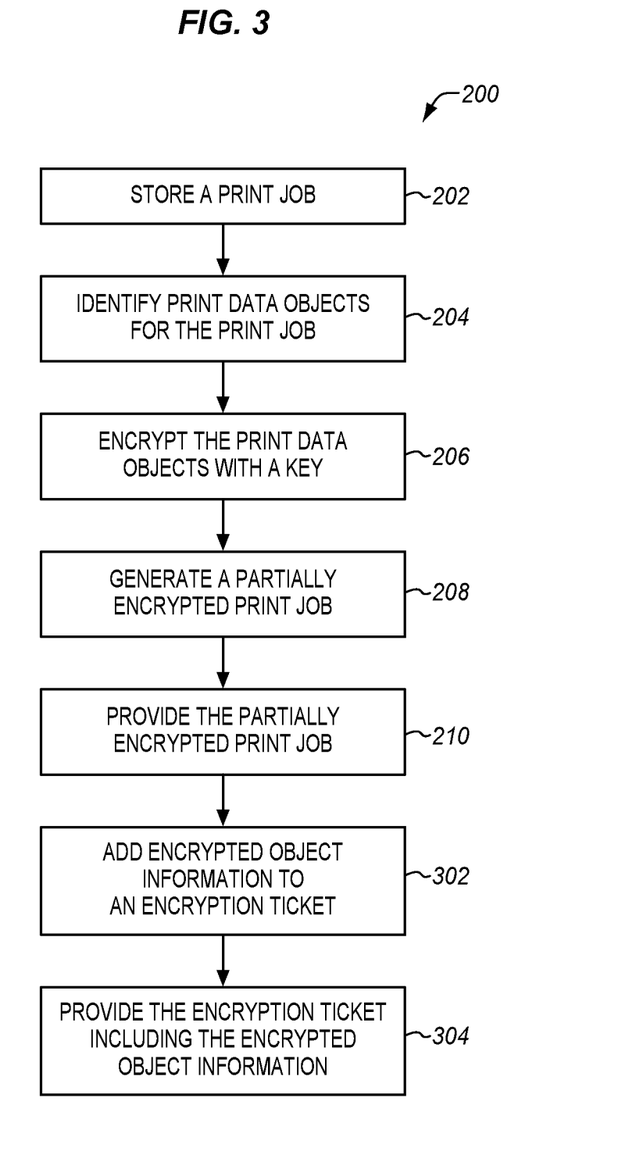
FIGS. 3-6 illustrates additional details of method 200 in illustrative embodiments.

Referring to FIG. 3, processor 106 may add encrypted object information 142 to an encryption ticket 136 (see step 302), and processor 106 provides encryption ticket 136 (see step 304). For example, processor 106 may provide encryption ticket 136 to support provider 122. Encrypted object information 142 in encryption ticket 136 identifies encrypted print data objects 130 in partially encrypted print job 134. Encryption ticket 136 may be used, for example, by support provider 122 to identify encrypted print data objects 130 in partially encrypted print job 134 during a decryption process. For instance, if processor 106 uses public key 138 of support provider 122 to generate encrypted print data objects 130 in partially encrypted print job 134, then encrypted object information 142 in encryption ticket 136 may be used by support provider 122 along with private key 144 in order to selectively decrypt encrypted print data objects 130.

Figure 4:
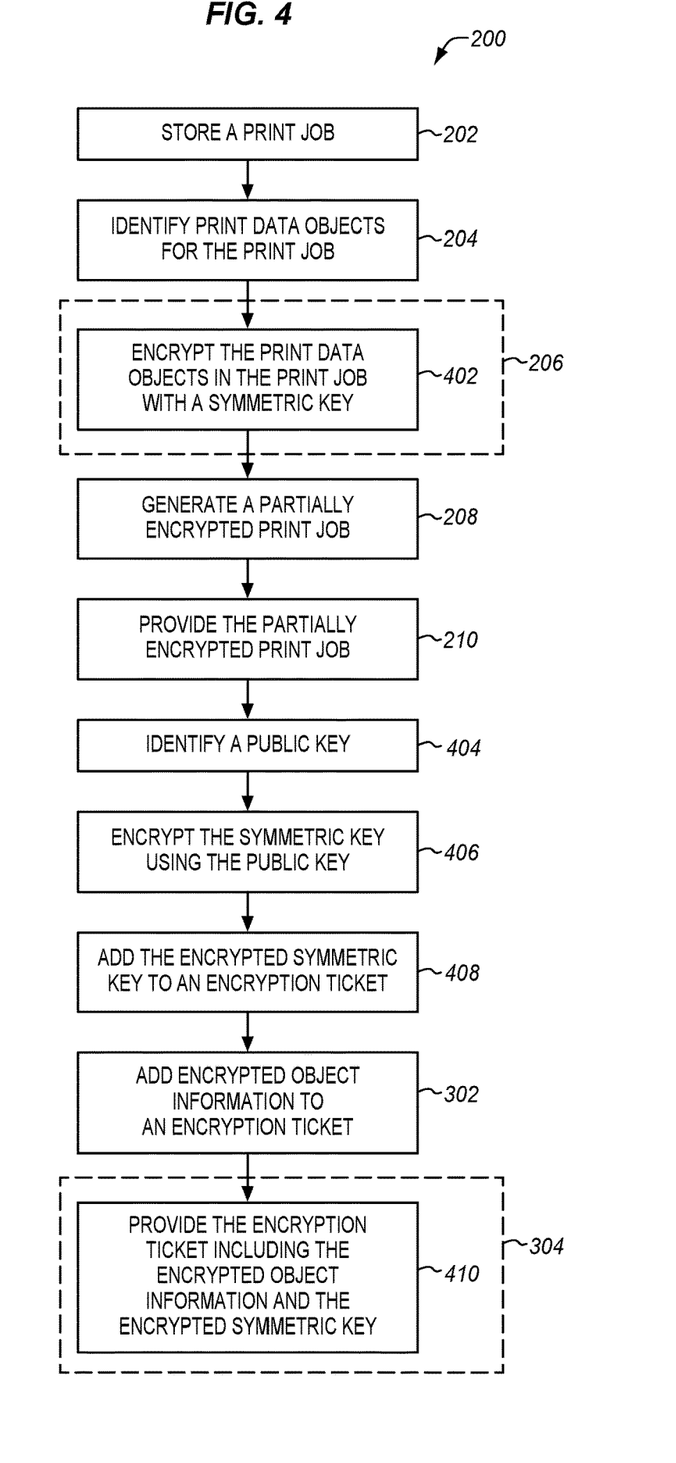

Referring to FIG. 4, it may be desirable in some cases to securely allow provider 122 access to symmetric key 128-1, when symmetric key 128-1 is unknown to support provider 122 and is used to encrypt print data objects 124 (see step 402 of FIG. 4). Further, it may be desirable to not expose the plaintext version of symmetric key 128-1 outside of print controller 102. To do so, processor 106 may identify public key 138 of support provider 122 (see step 404), and encrypt symmetric key 128-1 using public key 138 to generate encrypted symmetric key 140 (see step 406 of FIG. 4 and FIG. 1). Processor 106 adds encrypted symmetric key 140 to encryption ticket 136 (see step 408), and provides encryption ticket 136 (see step 410). For example, processor 106 may provide encryption ticket 136 to support provider 122. Support provider 122 may use private key 144 to decrypt encrypted symmetric key 140. Using symmetric key 128-1 and encrypted object information 142 in encryption ticket 136, support provider 122 may then decrypt encrypted print data objects 130 in partially encrypted print job 134.

In one embodiment, processor 106 may additionally or alternatively identify (e.g., receive from a Graphical User Interface (GUI) 146 or other elements of apparatus 100) any combination of attribute information such as print data objects 124, key 128, an apparatus identifier (e.g., serial number, model number, location, and/or etc.), a print system code level, a time stamp, operator descriptive information, a problem record number, a trace file and a trace file name. Processor 106 may add the identified attribute information to encryption ticket 136. In another embodiment, encryption ticket 136 may be a data list that comprises attribute identifiers and the corresponding attribute values.

As briefly discussed above, it may be desirable in some cases to encrypt some of print data objects 124 and not others. For example, text objects in print job 116 may include sensitive information, while bar codes in print job 116 may not include sensitive information. Thus, it may be more computationally efficient to differentially encrypt print data objects 124 in print job 116.

Figure 5:
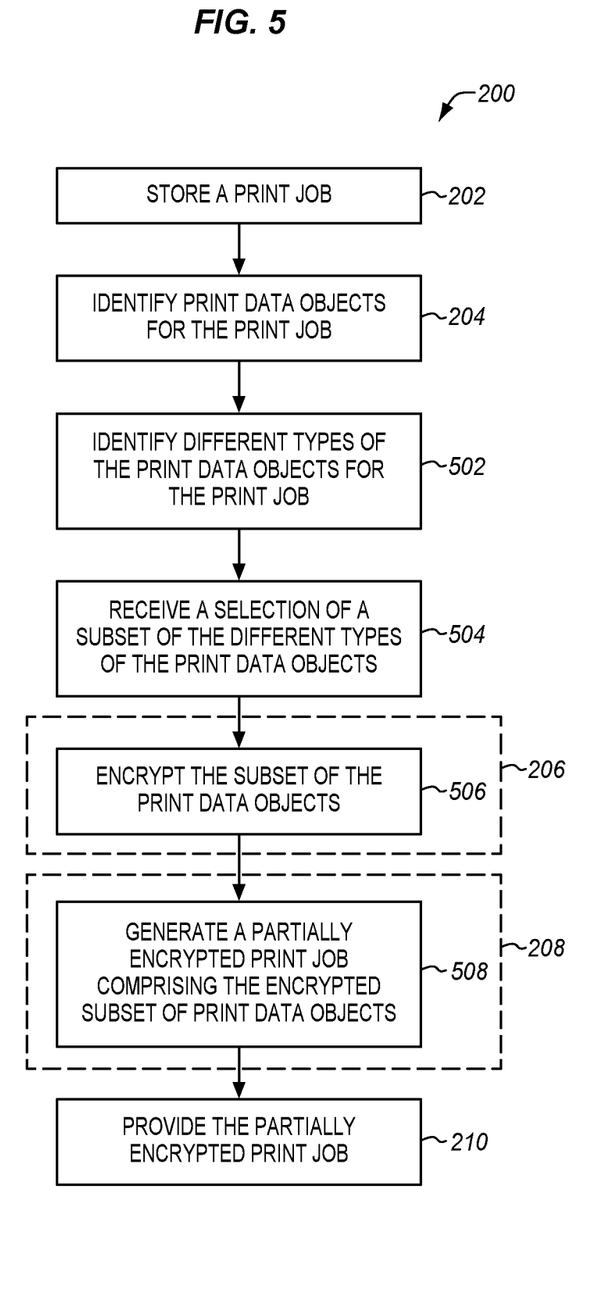

Referring to FIG. 5, processor 106 may identify different types of print data objects 124 in print job 116 (see step 502). For instance, in when print job 116 is in the IPDS format, processor 106 may identify text data types using WT commands in print job 116, image data types using WI or WI2 commands in print job 116, etc. In response to processor 106 analyzing print job 116 to determine the different types of print data objects 124 for print job 116, processor 106 may receive a selection of a subset of the different types of print data objects 124 for print job 116 (see step 504). In one embodiment, processor 106 may display the different types of print data objects 124 to print operator 120 utilizing GUI 146, thereby allowing print operator 120 to select the subset of print data objects 124 for print job 116 that will be encrypted. In another embodiment, processor 106 may select the subset of print data objects 124 for print job 116 based on an algorithm, a rule, and/or information in print job 116.

Referring to FIG. 1, GUI 146 comprises any component, system, or device that displays information to print operator 120, and allows print operator 120 to interact with apparatus 100. GUI 146 may comprise displays, pointing devices, keyboards, mice, touch screens, or any combination thereof that allows print operator 120 and apparatus 100 to interact with each other.

Referring again to FIG. 5, processor 106 encrypts the subset of print data objects 124 in print job 116 using key 128 (see step 506), and generates partially encrypted print job 134 (see step 508), which includes encrypted print data objects 130 (printable data types selected from print job 116) and unencrypted print data objects 132 (printable data types not selected from print job 116). Processor 106 may then provide partially encrypted print job 134 as previously described above.

In some embodiments, print controller 102 may generate print jobs 116 as part of the debug process, based on electronic images 148 (see FIG. 1) of the printed output of jobs in order to visually record the printing errors in the jobs. Referring to FIGS. 6-7, processor 106 may receive and store a first print job 116-1 from host system 118 (see step 602 of FIG. 6). In this embodiment, first print job 116-1 includes print data objects 124-1 and print job commands 126-1. Processor 106 may then perform method 200 as depicted in FIG. 2 and described earlier in order to generate partially encrypted print job 134-1, which includes encrypted print data objects 130-1 (encrypted versions of print data objects 124-1) and print job commands 126-1 that remain unencrypted. Partially encrypted print job 134-1 may also include unencrypted print data objects 132-1 (non-selected unencrypted versions of print data objects 124-1 in first print job 116-1).

Referring again to FIG. 6, processor 106 identifies electronic images 148 (see step 604 of FIG. 6). For instance, processor 106 may instruct print operator 120 (e.g., using GUI 146) to capture electronic images 148 of the printed output of first print job 116-1 (e.g., print operator 120 may create electronic images 148 using a digital camera, scanner, and/or a smart phone, and upload or otherwise provide print controller 102 access to electronic images 148). Processor 106 generates one or more second print job(s) 116-2 based on electronic images 148 (see step 606 and FIG. 7). In this embodiment, print data objects 124-2 for second print job(s) 116-2 and print job commands 126-2 for second print job(s) 116-2 are based on electronic images 148. For instance, if second print job(s) 116-2 are formatted in IPDS, then print data objects 124-2 for second print job(s) 116-2 may comprise object containers, with WOC commands defining the object containers that include electronic images 148.

In some embodiments, second print job(s) 116-2 are print-ready, and include a sufficient variety of print job commands 126-2 in order to generate a printed output of second print job(s) 116-2 at a printer. In other embodiments, second print job(s) 116-2 are not print-ready, and includes a subset of a sufficient variety of print job commands 126-2 used to generate a printed output of second print job(s) 116-2. One IPDS example of when second print job(s) 116-2 may not be print-ready is when second print job(s) 116-2 includes print job commands 126-2 for representing electronic images 148 (e.g., WOC commands) but do not include other types of print job commands 126-2 such as Begin Page (BP) and End Page (EP) commands.

In response to generating second print job(s) 116-2, processor 106 performs a process similar to that previously described for method 200 to generate one or more partially encrypted versions of second print job(s) 116-2. To do so, processor 106 identifies print data objects 124-2 in second print job(s) 116-2 (see step 608 of FIG. 6), encrypts print data objects 124-2 using key 128 (see step 610), and generates one or more partially encrypted print job(s) 134-2 (see step 612), which includes encrypted print data objects 130-2 (e.g., encrypted versions of print data objects 124-2 in second print job(s) 116-2), and print job commands 126-2 that remain unencrypted. Processor 106 may then provide partially encrypted print job(s) 134-2 (see step 614). In some embodiments, processor 106 may provide partially encrypted print job(s) 134-2 to support provider 122, which includes encrypted versions of electronic images 148, along with partially encrypted print job 134-1, which is a partially encrypted version of first print job 116-1 that includes encrypted print data objects 130-1 (i.e., encrypted versions of print data objects 124-1), unencrypted print data objects 132-1 (i.e., unencrypted versions of print data objects 124-1), and print job commands 126-1 that remain unencrypted. In other embodiments, processor 106 may provide partially encrypted print job(s) 134-2 without providing partially encrypted print job 134-1. For instance, it may be desirable to provide encrypted versions of electronic images 148 independently of the previously described activities associated with first print job 116-1.

By processing the electronic images 148 according to method 200 (see FIG. 6), the resulting partially encrypted print job 134-1 and partially encrypted print job(s) 134-2 have a structure in common. A structure in common allows the recipient (e.g., support provider 122) to use common further processing steps for greater efficiency.

The use of partially encrypted print jobs 134 provides the ability to diagnose problems for print jobs 116 while ensuring that the sensitive information within print jobs 116 remains secure.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as programmed instructions executable by a processor or a computer to perform the functions of the element. Some examples of programmed instructions are software, program code, and firmware. The programmed instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Figure 8:
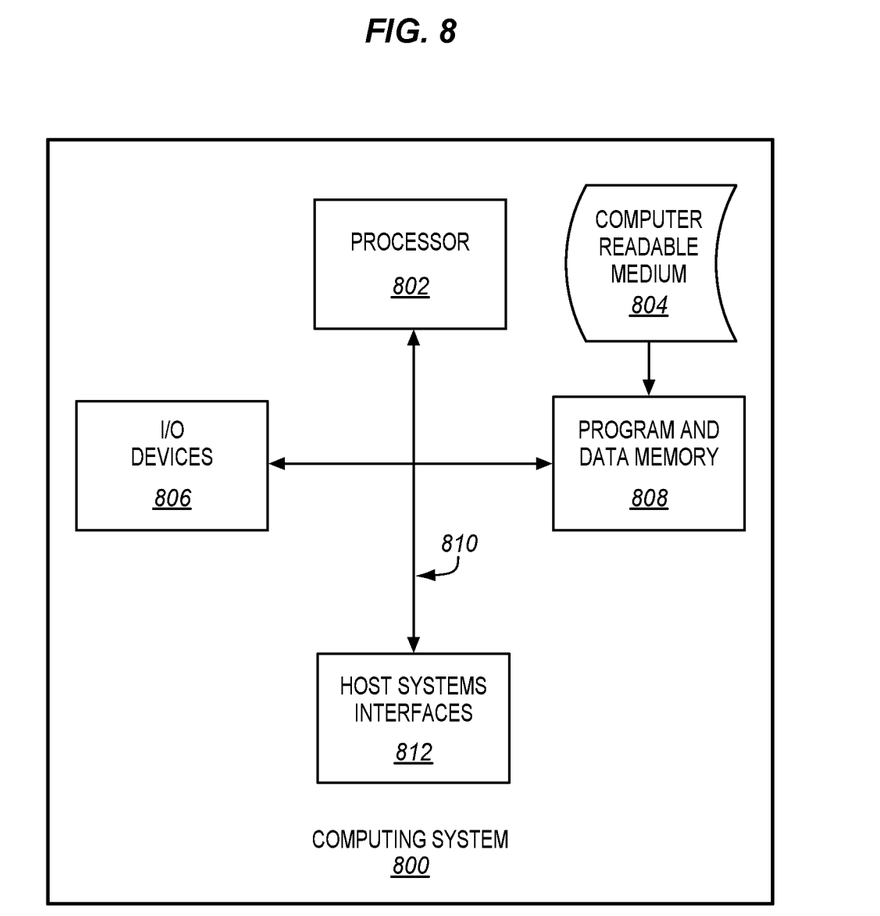
FIG. 8 illustrates a computing system in which a computer readable medium may provide instructions for performing any of the functionality disclosed herein.

In one embodiment, the invention is implemented in software, which includes but is not limited to firmware, resident software, microcode, etc. FIG. 8 illustrates a computing system 800 in which a computer readable medium 804 may provide instructions for performing any of the functionality disclosed herein.

Furthermore, the invention can take the form of a computer program product accessible from computer readable medium 804 that provides program code for use by or in connection with a processor or any instruction execution system. For the purposes of this description, computer readable medium 804 can be any apparatus that can tangibly store the program for use by or in connection with the instruction execution system, apparatus, or device, including computing system 800.

Computer readable medium 804 can be any tangible electronic, magnetic, optical, electromagnetic, infrared, or semiconductor system (or apparatus or device). Examples of computer readable medium 804 include a semiconductor or solid-state memory, magnetic tape, a removable computer diskette, a random-access memory (RAM), a read-only memory (ROM), a rigid magnetic disk and an optical disk. Some examples of optical disks include compact disk-read only memory (CD-ROM), compact disk-read/write (CD-R/W) and DVD.

Computing system 800, suitable for storing and/or executing program code, can include one or more processors 802 coupled directly or indirectly to memory 808 through a system bus 810. Memory 808 may include local memory employed during actual execution of the program code, bulk storage, and cache memories which provide temporary storage of at least some program code in order to reduce the number of times code is retrieved from bulk storage during execution. Input/output (TO) devices 806 (including but not limited to keyboards, displays, pointing devices, etc.) can be coupled to the system either directly or through intervening IO controllers. Network adapters may also be coupled to the system to enable computing system 800 to become coupled to other data processing systems, such as through host systems interfaces 812, or remote printers or storage devices through intervening private or public networks. Modems, cable modem and Ethernet cards are just a few of the currently available types of network adapters.

Although specific embodiments were described herein, the scope is not limited to those specific embodiments. Rather, the scope is defined by the following claims and any equivalents thereof

What is claimed is:

1. An apparatus, comprising:
a print controller, comprising:
a memory configured to store a print job comprising one or more print data objects, and print job commands that define data boundaries in the print job for the print data objects, wherein each print job command controls how an associated print data object is to visually appear on a page; and
at least one processor configured to process the print job commands to identify the print data objects for the print job based on the data boundaries, configured to encrypt the print data objects using a key forming encrypted print data objects while the print job commands remain unencrypted forming unencrypted print job commands, configured to generate a partially encrypted print job comprising the encrypted print data objects and the unencrypted print job commands, configured to determine that the print job includes an error, and, responsive to determining that the print job includes the error, configured to provide the partially encrypted print job for secure print job error analysis.

2. The apparatus of claim 1, wherein:
the at least one processor is configured to add encrypted object information to an encryption ticket that identifies the encrypted print data objects in the partially encrypted print job, and configured to provide the encryption ticket comprising the encrypted object information.

3. The apparatus of claim 2, wherein:
the key comprises a symmetric key,
the at least one processor is configured to identify a public key, configured to encrypt the symmetric key using the public key, and configured to add the encrypted symmetric key to the encryption ticket, and to provide the encryption ticket comprising the encrypted object information and the encrypted symmetric key.

4. The apparatus of claim 1, wherein:
the print job comprises an Intelligent Printer Data Stream (IPDS) print job, and
the at least one processor is configured to identify the print data objects for the print job based on at least one of:
a Write Text (WT) command in the IPDS print job;
a Write Image (WI) command in the IPDS print job;
a Write Image 2 (WI2) command in the IPDS print job;
a Write Graphics (WG) command in the IPDS print job;
a Write Bar Code (WBC) command in the IPDS print job; and
a Write Object Container (WOC) command in the IPDS print job.

5. The apparatus of claim 1, wherein:
the at least one processor is configured to identify different types of the print data objects for the print job, configured to receive a selection of a subset of the different types of the print data objects, configured to encrypt the subset of the different types of the print data objects using the key, and configured to generate the partially encrypted print job comprising the encrypted subset of the print data objects and the unencrypted print job commands.

6. The apparatus of claim 1, wherein:
the at least one processor is configured to identify one or more electronic images, and configured to generate at least one second print job comprising one or more second print data objects of the electronic images, and second print job commands that define second data boundaries in the at least one second print job for the second print data objects, and
the at least one processor configured to process the second print job commands to identify the second print data objects for the at least one second print job based on the second data boundaries, configured to encrypt the second print data objects using the key forming encrypted second print data objects, while the second print job commands remain unencrypted forming unencrypted second print job commands, configured to generate at least one second partially encrypted print job comprising the encrypted second print data objects and the unencrypted second print job commands, and configured to provide the at least one second partially encrypted print job.

7. The apparatus of claim 1, wherein:
the at least one processor is configured to rasterize logical pages in the print job to generate raster data, and configured to transmit the raster data to a destination, and
the apparatus further comprises:
at least one print engine configured to receive the raster data, and configured to mark at least one colorant onto a medium based on the raster data to generate a printed output of the print job.

8. A method performed by at least one processor of a print controller comprising:
storing, by the print controller, a print job comprising one or more print data objects, and print job commands that define data boundaries in the print job for the print data objects, wherein each print job command controls how an associated print data object is to visually appear on a page;
processing, by the print controller, the print job commands to identify the print data objects for the print job based on the data boundaries;
encrypting, by the print controller, the print data objects using a key, forming encrypted print data objects, while the print job commands remain unencrypted, forming unencrypted print job commands;
generating, by the print controller, a partially encrypted print job comprising the encrypted print data objects and the unencrypted print job commands;
determine, by the print controller, that the print job includes an error; and
responsive to determining that the print job includes the error, providing, by the print controller, the partially encrypted print job for secure print job error analysis.

9. The method of claim 8, further comprising:
adding, by the print controller, encrypted object information to an encryption ticket that identifies the encrypted print data objects in the partially encrypted print job; and
providing, by the print controller, the encryption ticket comprising the encrypted object information.

10. The method of claim 9, wherein:
the key comprises a symmetric key, and
the method further comprises:
identifying, by the print controller, a public key;
encrypting, by the print controller, the symmetric key using the public key; and
adding, by the print controller, the encrypted symmetric key to the encryption ticket; and
providing, by the print controller, the encryption ticket further comprises:

providing the encryption ticket comprising the encrypted object information and the encrypted symmetric key.

11. The method of claim 8, wherein:
the print job comprises an Intelligent Printer Data Stream (IPDS) print job, and
identifying the print data objects comprises identifying at least one of:
   a Write Text (WT) command in the IPDS print job;
   a Write Image (WI) command in the IPDS print job;
   a Write Image 2 (WI2) command in the IPDS print job;
   a Write Graphics (WG) command in the IPDS print job;
   a Write Bar Code (WBC) command in the IPDS print job; and
   a Write Object Container (WOC) command in the IPDS print job.

12. The method of claim 8, further comprising:
identifying, by the print controller, different types of the print data objects for the print job;
receiving, by the print controller, a selection of a subset of the different types of the print data objects; and
wherein encrypting the print data objects further comprises:
   encrypting the subset of the different types of the print data objects using the key; and
wherein generating the partially encrypted print job further comprises:
   generating the partially encrypted print job comprising the encrypted subset of the print data objects and the unencrypted print job commands.

13. The method of claim 8, wherein:
the method further comprises:
   identify, by the print controller, one or more electronic images; and
   generating, by the print controller, at least one second print job comprising one or more second print data objects of the electronic images, and second print job commands that define second data boundaries in the at least one second print job for the second print data objects; and
   processing the print job further comprises:
      processing the second print job commands to identify the second print data objects for the at least one second print job based on the second data boundaries;
   encrypting the print data objects further comprises:
      encrypting the second print data objects using the key forming encrypted second print data objects while the second print job commands remain unencrypted forming unencrypted second print job commands;
   generating the partially encrypted print job further comprises:
      generating at least one second partially encrypted print job comprising the encrypted second print data objects and the unencrypted second print job commands; and
   providing the partially encrypted print job further comprises:
      providing the at least one second partially encrypted print job.

14. The method of claim 8, wherein:
the key comprises a symmetric key,
the method further comprises:
   adding, by the print controller, encrypted object information to an encryption ticket that identifies the encrypted print data objects in the partially encrypted print job;
   identifying, by the print controller, a public key of a support provider;
   encrypting, by the print controller, the symmetric key using the public key;
   adding, by the print controller, the encrypted symmetric key to the encryption ticket; and
   providing, by the print controller, the partially encrypted print job and the encryption ticket comprising the encrypted object information and the encrypted symmetric key to the support provider.

15. A non-transitory computer-readable medium including programmed instructions which, when executed by at least one processor of a print controller, directs the at least one processor to:
   store a print job comprising one or more print data objects, and print job commands that define data boundaries in the print job for the print data objects, wherein each print job command controls how an associated print data object is to visually appear on a page;
   process the print job commands to identify the print data objects for the print job based on the data boundaries;
   encrypt the print data objects using a key, forming encrypted print data objects, while the print job commands remain unencrypted, forming unencrypted print job commands;
   generate a partially encrypted print job comprising the encrypted print data objects and the unencrypted print job commands;
   determine that the print job includes an error; and
   responsive to determining that the print job includes the error, provide the partially encrypted print job for secure print job error analysis.

16. The non-transitory computer-readable medium of claim 15, wherein the programmed instructions further direct the at least one processor to:
   add encrypted object information to an encryption ticket that identifies the encrypted print data objects in the partially encrypted print job; and
   provide the encryption ticket comprising the encrypted object information.

17. The non-transitory computer-readable medium of claim 16, wherein:
the key comprises a symmetric key, and
the programmed instructions further direct the at least one processor to:
   identify a public key;
   encrypt the symmetric key using the public key;
   add the encrypted symmetric key to the encryption ticket; and
   provide the encryption ticket comprising the encrypted object information and the encrypted symmetric key.

18. The non-transitory computer-readable medium of claim 15, wherein:
the print job comprises an Intelligent Printer Data Stream (IPDS) print job, and
the programmed instructions direct the at least one processor to identify the print data objects for the print job based on at least one of:

a Write Text (WT) command in the IPDS print job;
a Write Image (WI) command in the IPDS print job;
a Write Image 2 (WI2) command in the IPDS print job;
a Write Graphics (WG) command in the IPDS print job;
a Write Bar Code (WBC) command in the IPDS print job; and
a Write Object Container (WOC) command in the IPDS print job.

19. The non-transitory computer-readable medium of claim 15, wherein:
the programmed instructions direct the at least one processor to:
identify different types of the print data objects for the print job;
receive a selection of a subset of the different types of print data objects;
encrypt the subset of the different types of the print data objects using the key; and
generate the partially encrypted print job comprising the encrypted subset of the print data objects and the unencrypted print job commands.

20. The non-transitory computer-readable medium of claim 15, wherein:
the programmed instructions further direct at least one processor to:
identify one or more electronic images;
generate at least one second print job comprising one or more second print data objects of the electronic images, and second print job commands that define second data boundaries in the at least one second print job for the second print data objects;
process the second print job commands to identify the second print data objects for the at least one second print job based on the second data boundaries;
encrypt the second print data objects using the key forming encrypted second print data objects while the second print job commands remain unencrypted forming unencrypted second print job commands;
generate at least one second partially encrypted print job comprising the encrypted second print data objects and the unencrypted second print job commands; and
provide the at least one second partially encrypted print job.

* * * * *